United States Patent
Miyanoo et al.

(10) Patent No.: US 7,237,530 B2
(45) Date of Patent: Jul. 3, 2007

(54) CONTROL APPARATUS OF INTERNAL COMBUSTION ENGINE

(75) Inventors: Yuuji Miyanoo, Seto (JP); Kiyoo Hirose, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/256,096

(22) Filed: Oct. 24, 2005

(65) Prior Publication Data

US 2006/0090729 A1  May 4, 2006

(30) Foreign Application Priority Data

Oct. 29, 2004  (JP)  ............................ 2004-317201

(51) Int. Cl.
*F02D 13/02* (2006.01)

(52) U.S. Cl. ...................................... 123/346; 123/348

(58) Field of Classification Search ................ 123/346, 123/321, 325, 326, 328, 361, 376, 403, 404, 123/405; 701/104

See application file for complete search history.

(56) References Cited

U.S. PATENT DOCUMENTS

| 6,082,338 A | 7/2000 | Izutani et al. |
| 6,532,944 B1 | 3/2003 | Leone et al. |
| 6,584,956 B2 * | 7/2003 | Machida ................. 123/406.47 |
| 6,688,287 B2 * | 2/2004 | Machida ................. 123/406.65 |
| 6,895,927 B2 * | 5/2005 | Fuwa .......................... 123/336 |
| 7,051,704 B2 * | 5/2006 | Kawamura ................... 123/322 |
| 7,073,469 B2 * | 7/2006 | Nohara et al. ............ 123/90.16 |

FOREIGN PATENT DOCUMENTS

| DE | 199 28 560 A1 | 12/2000 |
| JP | A 2001-263015 | 9/2001 |
| WO | WO 03/048553 A1 | 6/2003 |

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

A control apparatus for an internal combustion engine provided with a fuel vapor treatment system according to the invention includes a controller that discharges fuel vapor into an intake passageway by using the intake negative pressure, and which adjusts the amount of the intake air through the cooperative control of a variable control of at least one of the lift amount of an intake valve and the working angle of the intake valve, and a control of the degree of opening of a throttle valve. In addition, the control apparatus executes the variable control so that at least one of the lift amount and the working angle of the intake valve changes in accordance with the fuel vapor concentration in the fuel vapor treatment system.

6 Claims, 7 Drawing Sheets

CONTROL APPARATUS OF INTERNAL COMBUSTION ENGINE

INCORPORATION BY REFERENCE

The disclosure of Japanese Patent Application No. 2004-317201 filed on Oct. 29, 2004, including the specification, drawings and abstract is incorporated herein by reference in its entirety.

BACKGROUND OF THE INVENTION

1. Field of the Invention

The invention relates to a control apparatus for an internal combustion engine having a fuel vapor treatment system that adjusts the amount of intake air through the cooperative control of the variable control of either or both of the lift amount of an intake valve and the working angle of the intake valve with the control in the degree of opening of a throttle valve.

2. Description of the Related Art

As a system adopted in internal combustion engines of vehicles and the like, systems that provide for the variable control of the lift amount and the working angle of engine valves (intake-exhaust valves) in accordance with the engine operation condition have recently been put into practical use (see, e.g., Japanese Patent Application Laid-Open Publication No. 2001-263015). An internal combustion engine provided with such a variable lift/working angle control system, the amount of intake air fed to a combustion chamber can be reduced by decreasing the lift amount or the working angle of the intake valves. By reducing the amount of intake air in this manner, rather than constricting the opening of the throttle valve, the pumping loss can be reduced; hence, it is possible to operate the engine with lower output (less amount of air) and therefore improve fuel economy.

Furthermore, a control apparatus that adjusts the amount of intake air through the cooperative control of the variable control of the lift amount/working angle, and the degree of opening of the throttle valve has been proposed.

Some vehicle-mounted internal combustion engines and the like adopt a fuel vapor treatment system in which fuel vapor produced in the fuel tank is removed by collecting the fuel vapor in a canister temporarily and later, at the appropriate time, releasing it from the canister into intake air. In this fuel vapor treatment system, the release of collected fuel vapor into an intake passageway is carried out through the use of the pressure of intake air (intake negative pressure).

In internal combustion engines adopting the variable lift/working angle control system, because the amount of intake air is reduced by decreasing the lift amount or the working angle of the engine valves as described above, the degree of opening of the throttle valve remains relatively large even during a low-load engine operation. That is, the internal combustion engine is operated in a state where the intake negative pressure is close to the atmospheric pressure. Therefore, the release of collected fuel vapor into the intake passageway sometimes becomes difficult, and securement of a necessary amount of release may become impossible.

SUMMARY OF THE INVENTION

A control apparatus for an internal combustion engine includes a controller that is provided for an internal combustion engine that has a fuel vapor treatment system that discharges fuel vapor into the intake passageway when there is negative pressure in the intake passageway, and which adjusts the amount of intake air through the cooperative control of a variable control of at least one of an lift amount of an intake valve and an working angle of the intake valve, and a control of a degree of opening of a throttle valve, and which executes the variable control so that at least one of the lift amount and the working angle of the intake valve is changed in accordance with a fuel vapor concentration in the fuel vapor treatment system.

In this case, the controller may execute the variable control so that either or both of the lift amount and the working angle of the intake valve may increase as the fuel vapor concentration in the fuel vapor treatment system becomes higher.

Increases in either the lift amount or the working angle of the intake valve increases the amount of intake air. Therefore, in the apparatus that cooperatively controls the variable control and the throttle control, the degree of opening of the throttle valve decreases as the lift amount or the working angle increases under the condition that the amount of intake air is constant.

In the above-described construction, when the fuel vapor concentration is high, that is, when it is necessary to promptly discharge accumulated fuel vapor from the fuel vapor treatment system, at least one of the lift amount and the working angle of the intake valve is increased. If the lift amount/working angle of the intake valve is increased in this manner, the degree of opening of the throttle valve is decreased in order to keep the amount of intake air constant. As a result, the pressure in the intake passageway downstream of the throttle valve is reduced, so that it becomes possible to promptly release fuel vapor from the fuel vapor treatment system. Furthermore, when the fuel vapor concentration is low, the lift amount or the working angle of the intake valve can be reduced. Therefore, fuel economy can be improved.

The invention has been accomplished in view of the aforementioned circumstances. It is an object of the invention to provide a control apparatus for an internal combustion engine that is capable of releasing an amount of fuel vapor from the fuel vapor treatment system while improving the fuel economy through the variable control of the lift amount/working angle of the intake valve.

A control apparatus for an internal combustion engine provided with a fuel vapor treatment system that discharges fuel vapor into an intake passageway by using an intake negative pressure in accordance with the invention adjusts the amount of intake air through the cooperative control of a variable control of at least one of an lift amount of an intake valve and the working angle of the intake valve, and control of the degree of opening of a throttle valve, and is characterized in that the control apparatus executes the variable control so that at least one of the lift amount and the working angle of the intake valve is changed in accordance with the fuel vapor concentration in the fuel vapor treatment system.

In this case, the control apparatus may execute the variable control so that at least one of the lift amount and the working angle of the intake valve increases as the fuel vapor concentration in the fuel vapor treatment system increases.

Increases in either of the lift amount and the working angle of the intake valve results in an increase in the amount of intake air. Therefore, in the apparatus that carries out the cooperative control of the variable control and the throttle control, the degree of opening of the throttle valve decreases as the lift amount or the working angle increases while the amount of intake air remains constant.

In the above-described construction, when the fuel vapor concentration is high, that is, when it is necessary to promptly discharge accumulated fuel vapor from the fuel vapor treatment system, at least one of the lift amount and the working angle of the intake valve is increased. If the lift amount/working angle of the intake valve is increased in this manner, the degree of opening of the throttle valve is decreased in order to keep the amount of intake air constant. As a result, the pressure in the intake passageway downstream of the throttle valve is reduced so that is possible to promptly release fuel vapor from the fuel vapor treatment system. Furthermore, when the fuel vapor concentration is low, the lift amount or the working angle of the intake valve can be reduced. Therefore, the fuel economy can be improved.

Furthermore, the control apparatus may execute the variable control so that a lower limit value regarding at least one of the lift amount and the working angle of the intake valve is changed to a large value when the fuel vapor concentration in the fuel vapor treatment system is within a predetermined range.

The above-described construction avoids the situation where the lift amount of the intake valve becomes excessively small, that is, the degree of opening of the throttle valve increases to such an extent that fuel vapor cannot be properly released.

Furthermore, the control apparatus may also execute a variable control of changing a valve timing of an intake valve and a valve timing of an exhaust valve, and may execute a variable control of changing at least one of the valve timing of the intake valve and the valve timing of the exhaust valve so that a valve overlap is reduced when at least one of the lift amount and the working angle of the intake valve is increased.

Generally, if the lift amount or the working angle is merely increased, the duration in which both the intake valve and the exhaust valve are open, that is, a generally-termed valve overlap, becomes unnecessarily long. Therefore, in that case, the amount of exhaust gas returned from the exhaust passageway of the internal combustion engine to the combustion chamber, that is, the generally-termed amount of internal EGR, is increased significantly, which may result in an unstable state of engine operation. However, the above-described construction makes it possible to substantially avoid unnecessary increases of the valve overlap and therefore stabilizes the engine operation state.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description, the invention will be described in more detail in terms of exemplary embodiments.

Figure 1:
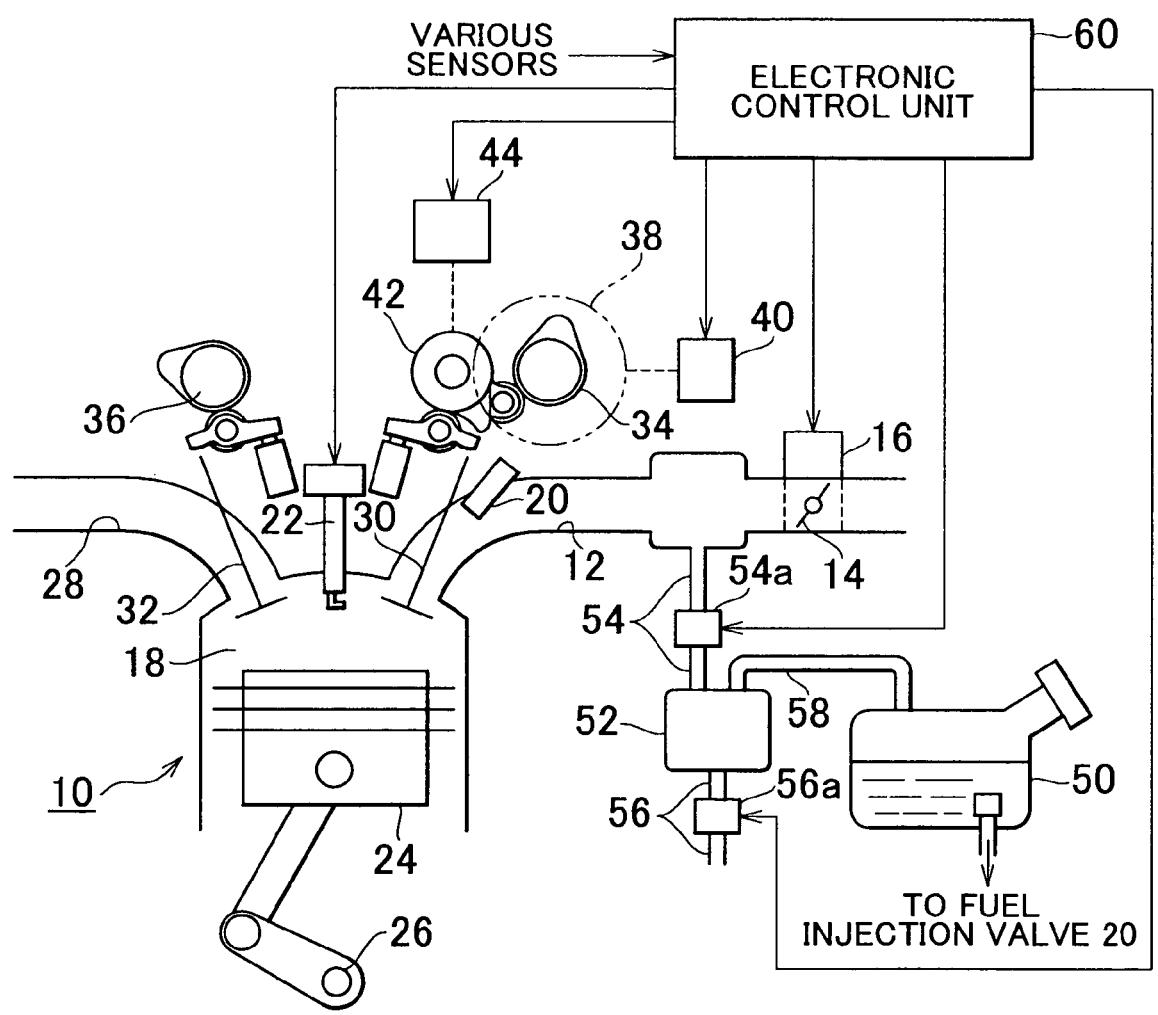
FIG. 1 is a diagram illustrating an overall construction of an embodiment of the control apparatus of an internal combustion engine of the invention.

FIG. 1 illustrates the overall construction of a control apparatus for internal combustion engine in accordance with an embodiment.

As shown in FIG. 1, an intake passageway 12 of an internal combustion engine 10 is provided with a throttle valve 14. A throttle motor 16 is connected to the throttle valve 14. Through the drive control of the throttle motor 16, the degree of opening of the throttle valve 14 (throttle opening amount TA) is adjusted, thereby adjusting the amount of intake air taken fed to a combustion chamber 18 through the intake passageway 12 (amount of intake air GA). Furthermore, the intake passageway 12 is provided with a fuel injection valve 20. This fuel injection valve 20 injects fuel into the intake passageway 12.

In the combustion chamber 18 of the internal combustion engine 10, a mixture formed by intake air and injected fuel is ignited. Thus, the mixture burns, so that a piston 24 reciprocates and causes the crankshaft 26 to rotate. The mixture after combustion is expelled, as exhaust gas, from the combustion chamber 18 into the exhaust passageway 28.

In the internal combustion engine 10, the opening and closing of the intake valve 30 and the exhaust valve 32 connect and disconnect, respectively, the intake passageway 12 and the exhaust passageway 28 from the combustion chamber 18. The intake valve 30 is opened and closed due to rotation of an intake camshaft 34 to which rotation is transferred from the crankshaft 26. Likewise, the exhaust valve 32 is opened and closed due to rotation of an exhaust camshaft 36 to which rotation is transferred from the crankshaft 26.

The intake camshaft 34 is provided with a variable valve timing mechanism 38. The variable valve timing mechanism 38 advances and retards the valve timing of the intake valve 30 by adjusting the relative rotation phase of the intake camshaft 34 with respect to the rotation phase of the crankshaft 26 (crank phase). The variable valve timing mechanism 38 is driven by controlling the hydraulic pressure that acts on the mechanism 38 through a hydraulic actuator 40. The manner of change in the valve timing of the intake valve 30 caused by the driving of the mechanism is indicated in FIG. 2.

Figure 2:
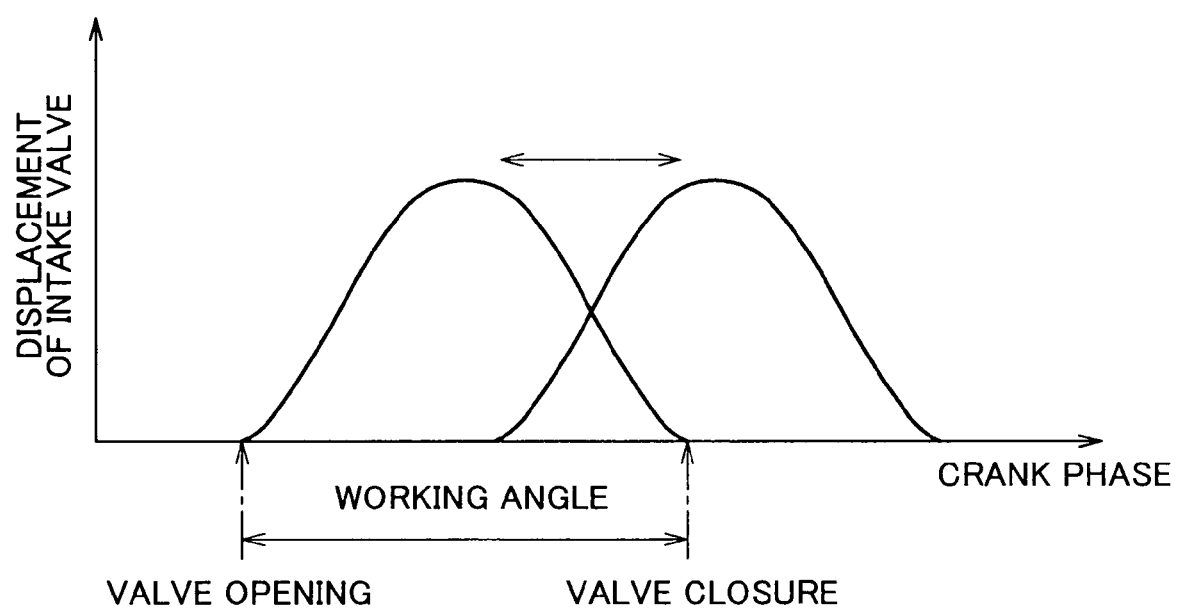
FIG. 2 is a graph indicating a manner of change of the valve timing of an intake valve based on the driving of a valve timing variable mechanism.

As can be seen from FIG. 2, by changing the valve timing, the valve opening timing and the valve closure timing of the intake valve 30 are advanced or retarded together while the open valve duration (working angle) of the intake valve 30 remains fixed.

Figure 3:
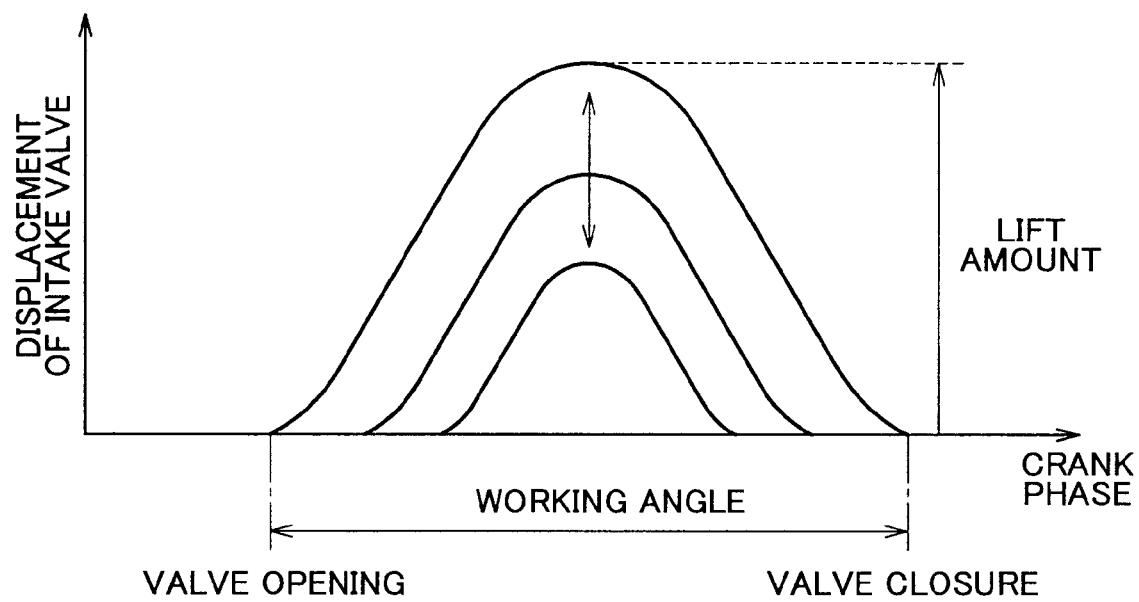
FIG. 3 is a graph indicating a manner of change of the lift amount of an intake valve based on the driving of a lift amount variable mechanism.

A variable lift mechanism 42 is provided between the intake valve 30 and the intake camshaft 34 (FIG. 1). The variable lift mechanism 42 variably sets the lift amount of the intake valve 30. The variable lift mechanism 42 is driven by an electric motor 44. The manner of change of the lift amount of the intake valve 30 based on the driving of the mechanism 42 is indicated in FIG. 3. As can be seen from FIG. 3, the lift amount of the intake valve 30 changes synchronously with the working angle; for example, as the lift amount becomes increases, the working angle also increases. An increase in the working angle increases the time interval between the opening and closing of the intake valve increases, thereby leaving the intake valve 30 open for a longer time.

In this embodiment, the amount of intake air GA is adjusted through the cooperative control of the degree of opening of the throttle valve 14 (FIG. 1) (throttle control) and the of the variable lift mechanism 42 (variable lift control). The amount of intake air GA increases as the throttle opening amount TA becomes larger, and as the lift amount of the intake valve 30 becomes larger. Therefore, through such cooperative control, the amount of intake air GA is adjusted to a desired amount by executing both the throttle control and the lift amount variable control by, for example, setting the lift amount of the intake valve 30 high when the throttle opening amount TA is set relatively small, and conversely, setting the lift amount low when the throttle opening amount TA is set relatively large.

The aforementioned internal combustion engine 10 is provided with a fuel vapor treatment system as described above. The fuel vapor treatment system is mainly constituted by a canister 52 for collecting fuel vapor (vapor) produced in a fuel tank 50, a purge passageway 54 for purging (i.e., expelling) the collected fuel vapor by releasing it into the intake passageway 12 of the internal combustion engine 10, and an atmosphere passageway 56 for introducing atmospheric air into the canister 52 when the purge is carried out, etc.

The interior of the canister 52 is filled with an adsorbent material, such as activated carbon. The purge passageway 54 leading to the intake passageway 12 is connected to the canister 52. The purge passageway 54 is provided with a purge control valve 54*a* that adjusts the cross sectional area of the purge passageway 54. The degree of opening of the purge control valve 54*a* is set on the basis of the state of operation of the internal combustion engine 10. Through the setting of the degree of opening of the purge control valve 54*a*, the amount of fuel vapor purged from the interior of the canister 52 to the intake passageway 12 may be adjusted in accordance with the state of operation of the internal combustion engine 10.

Furthermore, the canister 52 is connected to the fuel tank 50 via a vapor passageway 58. Through the vapor passageway 58, the fuel vapor in the fuel tank 50 is introduced into the canister 52.

Still further, the canister 52 is provided with the atmosphere passageway 56, in which an atmosphere valve 56*a* is mounted. The atmosphere valve 56*a* is usually kept in an open valve state. Therefore, when the pressure in the canister 52 is lower than the atmospheric pressure when the accumulated fuel vapor is purged, atmospheric air is introduced into the canister 52 through the atmosphere passageway 56. Conversely, if the pressure in the canister 52 is higher than the atmospheric pressure, air in the canister 52 is discharged into the atmosphere.

In the fuel vapor treatment system constructed as described above, when fuel vapor is produced in the fuel tank 50, the fuel vapor in the fuel tank 50 is introduced into the canister 52 through the vapor passageway 58, and is temporarily adsorbed to the adsorbent in the canister 52.

When the purge control valve 54*a* is opened during operation of the internal combustion engine 10, the pressure in the intake passageway 12 (intake negative pressure) is introduced into the purge passageway 54. Due to the introduced intake negative pressure, atmospheric air is introduced into the canister 52 through the atmosphere passageway 56. The fuel vapor in the canister 52 is desorbed from the adsorbent due to the atmospheric air, and is purged into the intake passageway 12 through the purge passageway 54.

The internal combustion engine 10 is provided with various sensor for the detecting states of operation thereof. The various sensors provided include, for example, a pressure sensor for detecting the pressure of intake air downstream of the throttle valve 14 (intake air pressure PM), and an oxygen sensor for detecting the oxygen concentration in the exhaust gas flowing in the exhaust passageway 28. Furthermore, a throttle sensor for detecting the degree of opening of the throttle valve 14 (throttle opening amount TA), a lift sensor for detecting the lift amount of the intake valve 30 (specifically, the amount of operation of the lift amount variable mechanism 42), etc., are also provided.

The internal combustion engine 10 is provided with an electronic control unit 60 that has, for example, a microcomputer. The electronic control unit 60 inputs detection signals from the various sensors, and caries out various computations. On the basis of computational results, the unit 60 executes various controls related to engine controls, such as the throttle control, the fuel injection control, the operation control of the valve timing variable mechanism 38, the lift amount variable control, the purge control, etc. Incidentally, the electronic control unit 60 executes, as one of the various controls, a generally-termed air fuel ratio feedback control, that is, a control of feedback-correcting the amount of fuel injection on the basis of the detection signal of the oxygen sensor, so as to bring the air fuel ratio of mixture gas closer to the stoichiometric air fuel ratio. The electronic control unit 60 corresponds to a controller in the invention.

In the variable lift control according to this embodiment, the lift amount of the intake valve 30 is decreased to improve the fuel economy of the internal combustion engine 10, in comparison with an apparatus that adjusts the amount of intake air GA on the basis of only the throttle opening amount TA.

Figure 4:
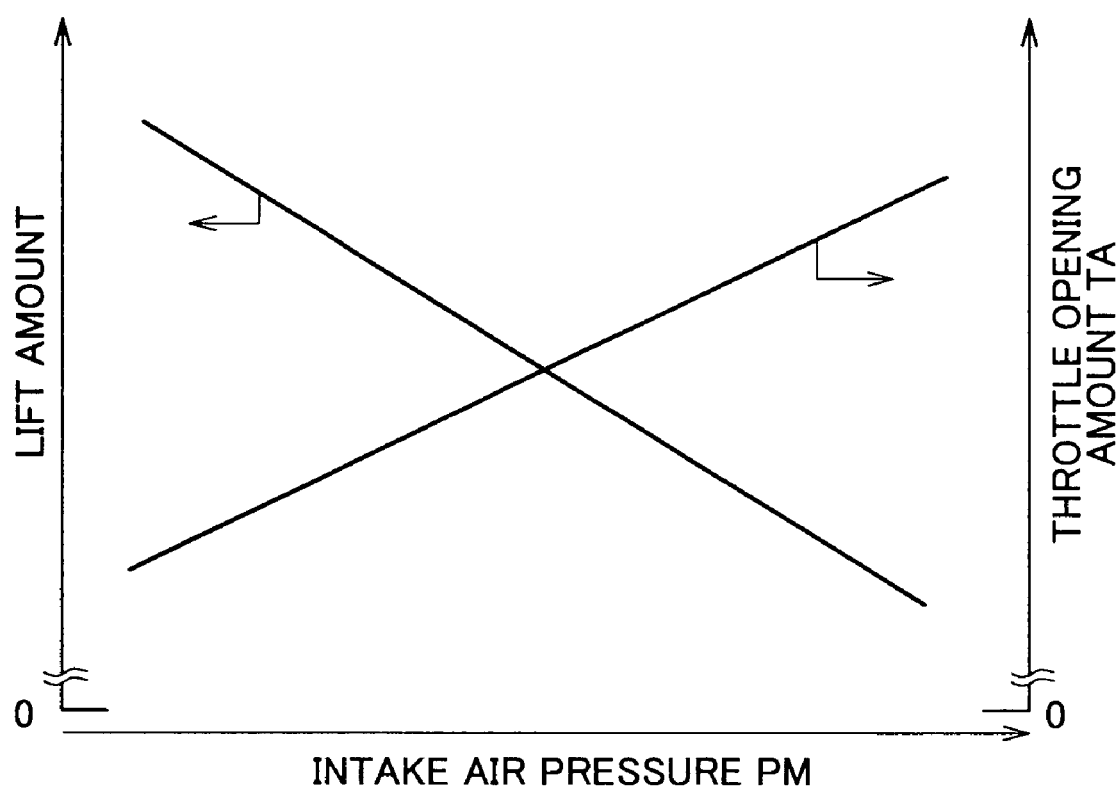
FIG. 4 is a graph indicating relationships between the lift amount of an intake valve, the throttle opening amount, and the intake air pressure under the condition that the amount of intake air is fixed.

FIG. 4 indicates relationships between the lift amount of the intake valve 30, the throttle opening amount TA, and the intake air pressure PM under the condition that the amount of intake air GA is fixed. As indicated in FIG. 4, the intake air pressure PM increases as the lift amount is decreased by the variable lift control under the condition that the amount of intake air GA is fixed. This is because as the lift amount decreases, the throttle opening amount TA increases, that is, the degree of throttling of the throttle valve 14 becomes smaller.

Therefore, if the lift amount of the intake valve 30 is merely decreased, fuel economy can be improved; however, the correspondingly increased intake air pressure PM makes it difficult for the fuel vapor treatment system to release the fuel vapor into the intake passageway 12.

To overcome this drawback, this embodiment alters the manner in which the variable lift control regulates the lift amount of the intake valve 30 so that the lift amount is increased when the fuel vapor concentration (vapor concentration) in the fuel vapor treatment system is high than when the vapor concentration is low. Therefore, when the vapor concentration is high, that is, when fuel vapor should be promptly discharged from the fuel vapor treatment system, the intake air pressure PM is decreased, so that the fuel vapor my be promptly discharged.

Hereinafter, the details regarding the manner in which control of the lift amount variable control is switched will be described. Initially, the method of learning the vapor concentration will be described.

In this embodiment, a vapor concentration learned value FGPG is determined as a value that corresponds to the vapor concentration. The vapor concentration learned value FGPG is determined (updated) in every predetermined period as in the equation (1), on the condition that the air fuel ratio feedback control is being executed and the purge process is being carried out.

$$FGPG=FGPGi+(FAF-1)/PGR \quad \text{EQUATION (1)}$$

FGPG: latest vapor concentration learned value
FGPGi: previous vapor concentration learned value
FAF: feedback correction factor
PGR: target purge rate Incidentally, the feedback correction factor FAF is used for the air fuel ratio feedback control, and is increased and decreased from "1.0" as a center value in accordance with whether the value indicated by the detection signal from the oxygen sensor is on the rich side or the lean side of the value that corresponds to the stoichiometric air fuel ratio. For example, if the value indicated by the detection signal of the oxygen sensor is on the rich side of the value that corresponds to the stoichiometric air fuel ratio, the feedback correction factor FAF is decreased to carry out a decreasing correction of the amount of fuel injected. However, if the value indicated by the detection signal of the oxygen sensor is on the lean side of the value that corresponds to the stoichiometric air fuel ratio, the feedback correction factor FAF is increased so as to carry out an increasing correction of the amount of fuel injection. Due to the correction of the amount of fuel injected based on the feedback correction factor FAF (target amount of fuel injected←basic value of the amount of fuel injected×FAF), the air fuel ratio of mixture approaches the stoichiometric air fuel ratio.

The target stoichiometric air fuel ratio PGR is a target value of the purge rate that represents the ratio between the amount of gas (purge gas) released from the fuel vapor treatment system into the intake passageway 12 and the amount of intake air GA (=amount of purge gas/GA), and is computed on the basis of the latest value of the feedback correction factor FAF, and the like. As for the target purge rate PGR, progressively greater values are computed as the feedback correction factor FAF is closer to "1.0". The feedback correction factor FAF being close to "1.0" means a state where the air fuel ratio feedback is stable. During this state, combustion degradation is unlikely to occur even if a large amount of purge gas is expelled into the intake passageway 12. Therefore, a large amount of fuel vapor adsorbed to the adsorbent in the canister 52 can be treated.

The vapor concentration learned value FGPG computed from the equation (1) on the basis of the feedback correction factor FAF and the target purge rate PGR assumes smaller values if the fuel vapor concentration in the purge gas is higher, that is, if more fuel vapor exists in the fuel vapor treatment system.

Hereinafter, a process for the manner in which control of the variable lift control is switched (switching process) will be described.

Figure 5:
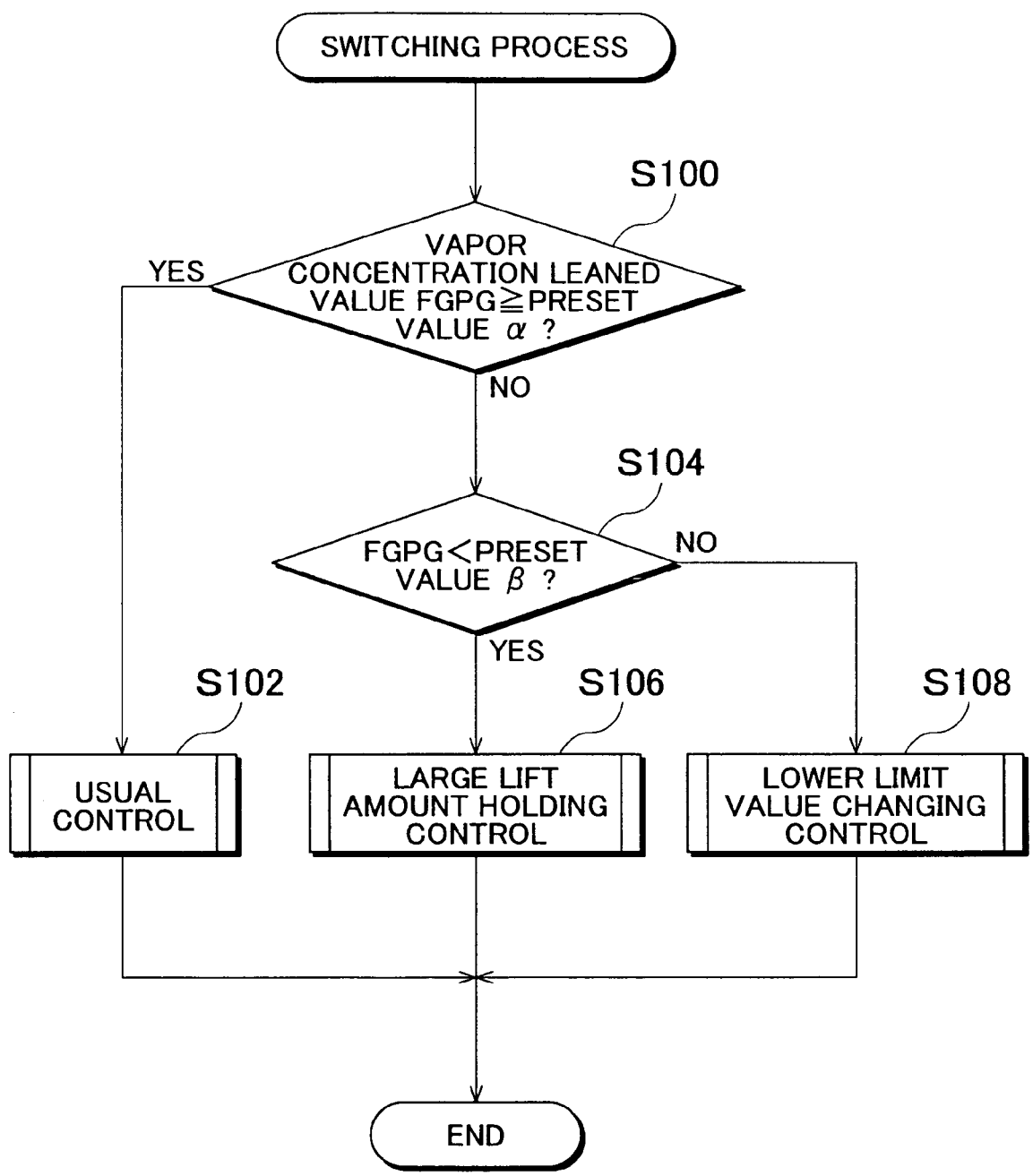
FIG. 5 is a flowchart illustrating a concrete processing procedure of a switching process.

The flowchart of FIG. 5 illustrates a concrete processing procedure of the switching process. A series of processes shown in this flowchart is executed as a process repeated in every predetermined period by the electronic control unit 60.

First in this process, it is judged whether the vapor concentration learned value FGPG is a predetermined value α or greater (step S100) as shown in FIG. 5. If the vapor concentration learned value FGPG is the predetermined value α or greater (YES at step S100), the lift amount is set relatively low (usual control) (step S102). In this case, it is considered that the vapor concentration in the fuel vapor treatment system has not become very high, and a variable lift control intended to improve the fuel economy is executed.

Conversely, if the vapor concentration learned value FGPG is less than the predetermined value α (NO at step S100), it is then judged whether the vapor concentration learned value FGPG is less than a predetermined value β (step S104). Then, if the vapor concentration learned value FGPG is less than the predetermined value β (YES at step S104), the lift amount of the intake valve 30 is changed to the maximum lift amount within a settable range and maintained at that setting (large lift amount holding control) (step S106). In this case, it is considered that the vapor concentration in the fuel vapor treatment system has become very high, and the intake air pressure PM is reduced as much as possible, so that fuel vapor is promptly released into the intake passageway 12.

On the other hand, if the vapor concentration learned value FGPG is less than the predetermined value α, and is equal to or greater than the predetermined value β (NO at steps S100 and S104), the lower limit value of the lift amount of the intake valve 30 (lower limit value changing control) is changed (step S108).

In the lower limit value changing control, the basic operation is to variably set the lift amount in the same manner as in the usual control. However, in a predetermined engine operation region where the intake air pressure PM exceeds a predetermined pressure P1 in the case where the lift amount is set in the aforementioned manner, the lift amount at which the intake air pressure PM and the predetermined pressure P1 become equal is set as the lower limit value of the lift amount. Thus, in the lower limit value changing control, the value set as a lower limit value of the lift amount is greater than the lower limit value (minimum lift amount within the settable range) in the usual control. Incidentally, the predetermined pressure P1 is a pressure value corresponding to the intake air pressure PM that provides a certain amount of purge gas flow, and is determined in accordance with the state of the fuel vapor treatment system, such as the pressure in the system, the degree of opening of the purge control valve 54a, etc.

In this case, it is considered that the vapor concentration in the fuel vapor treatment system has become relatively high. In order to actively execute the purge process, the variable lift control is executed while the change in the lift amount to a smaller side is limited, so that the intake air pressure PM will not exceed the predetermined pressure P1.

Thus, after an appropriate variable lift control is selected in accordance with the vapor concentration learned value FGPG, this process temporarily ends.

Figure 6:
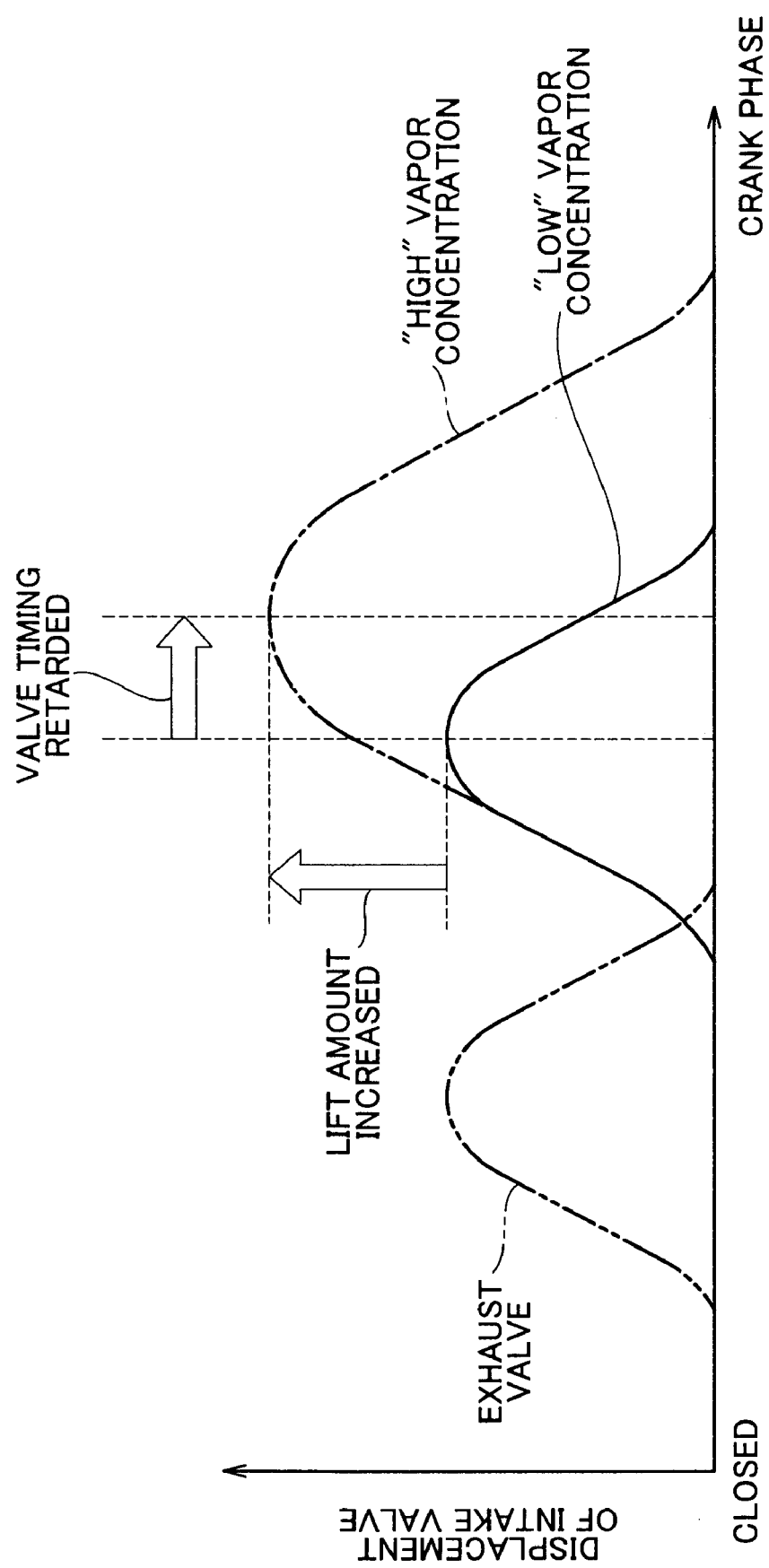
FIG. 6 is a graph indicating an example of the manner of changing the lift amount and the valve timing of an intake valve.

FIG. 6 indicates examples of the manner of displacement of the intake valve 30. In FIG. 6, a solid line indicates a manner of displacement in the case of a low vapor concentration, and a one-dot chain line indicates a manner of displacement in the case of a high vapor concentration. Furthermore, a two-dot chain line in FIG. 6 indicates an example of the manner of displacement of the exhaust valve 32.

As indicated in FIG. 6, in this embodiment, the lift amount of the intake valve 30 is set low when the vapor concentration is low, and the lift amount of the intake valve 30 is increased when the vapor concentration is high. Then, if the lift amount of the intake valve 30 is set high, the throttle opening amount TA is reduced in order to keep the amount of intake air GA constant through the cooperative control. As a result, the intake air pressure PM is lowered, so that the fuel vapor in the fuel vapor treatment system is promptly released into the intake passageway 12.

Furthermore, when the vapor concentration is low, that is, when there is not much fuel vapor in the fuel vapor treatment system, the lift amount of the intake valve 30 is set low, so that the fuel economy can be improved.

Figure 7:
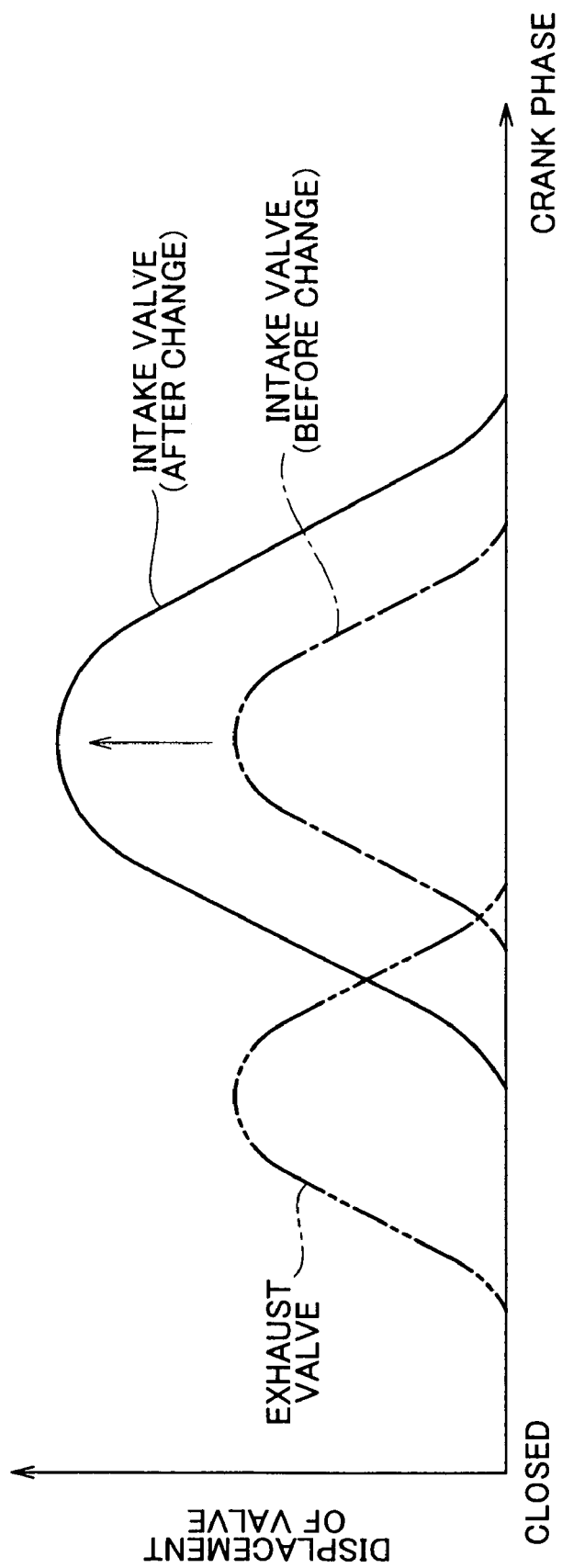
FIG. 7 is a graph indicating an example of the manner of displacements of valves in the case where the lift amount of the intake valve alone is increased.

If, as indicated in FIG. 7, the lift amount of the intake valve 30 is merely increased, the duration in which the intake valve 30 and the exhaust valve 32 are both open, generally referred to as valve overlap, becomes unnecessarily long. This leads to an unnecessary increase in the amount of exhaust gas returned from the exhaust passageway 28 of the internal combustion engine 10 to the combustion chamber 18, that is, the generally-termed amount of internal EGR, thus becoming a factor that causes unstable combustion of mixture in the combustion chamber 18, and therefore causes an unstable engine operation state.

Therefore, in this embodiment as shown in FIG. 6, when the vapor concentration is high, the valve timing of the intake valve 30 is retarded to reduce valve overlap is reduced, in addition to the increasing of the lift amount of the intake valve 30. Consequently, the unnecessary increases of the valve overlap that accompany increased amounts of lift can be substantially prevented, and the engine operation state can be stabilized.

As described above, this embodiment achieves the following advantages.

(1) The variable lift control is executed so that the lift amount of the intake valve 30 increases when the vapor concentration is high rather than when the vapor concentration is low. Therefore, when the vapor concentration is high, that is, when fuel vapor is desired to be promptly discharged from the fuel vapor treatment system, the intake air pressure PM can be set low, and therefore fuel vapor prompt can be promptly discharged. Furthermore, when the vapor concentration is low, the lift amount of the intake valve 30 can be decreased. Therefore, fuel economy can be improved.

(2) When the lower limit value changing control is selected as a variable lift control, the lower limit value of the lift amount is set greater than the lower limit value set for the usual control. Therefore, it becomes possible to avoid events where the lift amount of the intake valve 30 becomes excessively small, that is, the throttle opening amount TA increases to such an extent that fuel vapor cannot be properly released.

(3) When the vapor concentration is high, the valve timing of the intake valve 30 is retarded, in addition to the increasing of the lift amount of the intake valve 30. Therefore, unnecessary increases of the valve overlap can be substantially prevented, and the engine operation state can be stabilized.

The foregoing embodiment may be carried out with the following modifications. The learning method for the vapor concentration may be arbitrarily modified as long as learning with good precision is possible.

As for the lower limit value of the lift amount in the lower limit value changing control, the setting based on the predetermined pressure P1 that corresponds to the engine operation state is not restrictive. The lower limit value may be set based on a predetermined pressure other than P1, as long as a certain amount of purge gas flow or greater can be obtained.

The large lift amount holding control is not limited to the holding of the lift amount of the intake valve 30 at the maximum lift amount. As long as prompt release of fuel vapor is realized, the lift amount can be held at an arbitrary amount, for example, an lift amount that is slightly smaller than the maximum lift amount, and the like.

In the foregoing embodiment, the lift amount variable control that has three control modes (the usual control, the large lift amount holding control, and the lower limit value changing control) is adopted, and one of the controls is selected in accordance with the vapor concentration. Alternatively, a variable control that has two control modes, for example, the usual control and the large lift amount holding control, or the usual control and the lower limit value changing control, may be used. In this case, one of the two control modes may be selected in accordance with the vapor concentration.

In addition to the variable valve timing mechanism 38, a variable valve timing mechanism for the exhaust camshaft 36 may also be provided. In this case, the valve timing of the exhaust valve 32 may be advanced in association with the retarding of the valve timing of the intake valve 30. According to this construction, the unnecessary increases of the valve overlap that accompany increased amounts of lift can be properly curbed or prevented with a high degree of freedom.

In this construction, unnecessary increases of the valve overlap may also be curbed or prevented merely by retarding the valve timing of the exhaust valve 32. In this case, the valve timing variable mechanism 38 may be omitted.

The control apparatus of the invention is not limited to the internal combustion engines that have a variable lift mechanism that changes the lift amount and the working angle of an intake valve in a mutually synchronized fashion, but is also applicable to internal combustion engines that have a variable mechanism that changes only one of either the lift amount or the working angle of an intake valve. In such applications, it is appropriate that in the case of high vapor concentration, the lift amount of the intake valve be increased, or the working angle thereof be increased, in comparison with the case of low vapor concentration.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus of an internal combustion engine with a fuel vapor treatment system that discharges fuel vapor into an intake passageway by using an intake negative pressure, comprising:

a controller that adjusts an amount of intake air through cooperative control of a variable control of at least one of a lift amount of an intake valve and a working angle of the intake valve, and of a degree of opening of a throttle valve;

wherein the controller executes the variable control so that at least one of the lift amount and the working angle of the intake valve is changed in accordance with a fuel vapor concentration in the fuel vapor treatment system; and wherein the degree of opening of the throttle valve is controlled with respect to the lift amount/working angle of the valve so as to keep the amount of intake air constant.

2. The control apparatus for an internal combustion engine according to claim 1, wherein the controller executes the variable control so that at least one of the lift amount and the working angle of the intake valve increases as the fuel vapor concentration in the fuel vapor treatment system increases.

3. The control apparatus of an internal combustion engine according to claim 2, wherein the controller also variably changes valve timing of an intake valve and valve timing of an exhaust valve, and variably changes at least one of the valve timing of the intake valve and the valve timing of the exhaust valve so that a valve overlap is reduced when at least one of the lift amount and the working angle of the intake valve is increased.

4. The control apparatus of an internal combustion engine according to claim 2, wherein the controller executes the variable control so that a lower limit value regarding at least one of the lift amount and the working angle of the intake valve is increased when the fuel vapor concentration in the fuel vapor treatment system is within a predetermined range.

5. The control apparatus of an internal combustion engine according to claim 4, wherein the controller also executes a variable control of changing a valve timing of an intake valve and a valve timing of an exhaust valve, and executes a variable control of changing at least one of the valve timing of the intake valve and the valve timing of the exhaust valve so that a valve overlap is reduced when at least one of the lift amount and the working angle of the intake valve is increased.

6. A control apparatus of an internal combustion engine with a fuel vapor treatment system that discharges fuel vapor into an intake passageway by using an intake negative pressure, comprising:

a controller that adjusts an amount of intake air through cooperative control of a variable control of at least one of a lift amount of an intake valve and a working angle of the intake valve, and of a degree of opening of a throttle valve;

wherein the controller executes the variable control so that at least one of the lift amount and the working angle of the intake valve increases as the fuel vapor concentration in the fuel vapor treatment system increases;

wherein the degree of opening of the throttle valve is controlled with respect to the lift amount/working angle of the valve so as to keep the amount of intake air constant;

and wherein the controller also variably changes valve timing of an intake valve and valve timing of an exhaust valve, and variably changes at least one of the valve timing of the intake valve and the valve timing of the exhaust valve so that a valve overlap is reduced when at least one of the lift amount and the working angle of the intake valve is increased.

* * * * *